March 9, 1943.   G. C. KRATT, JR   2,313,156
METHOD OF INFLATING PNEUMATIC TIRES TO PROPER
INTERNAL AIR PRESSURE UNDER LOAD
Filed Feb. 12, 1941   3 Sheets-Sheet 1

Inventor
George C. Kratt, Jr.
By his Attorneys

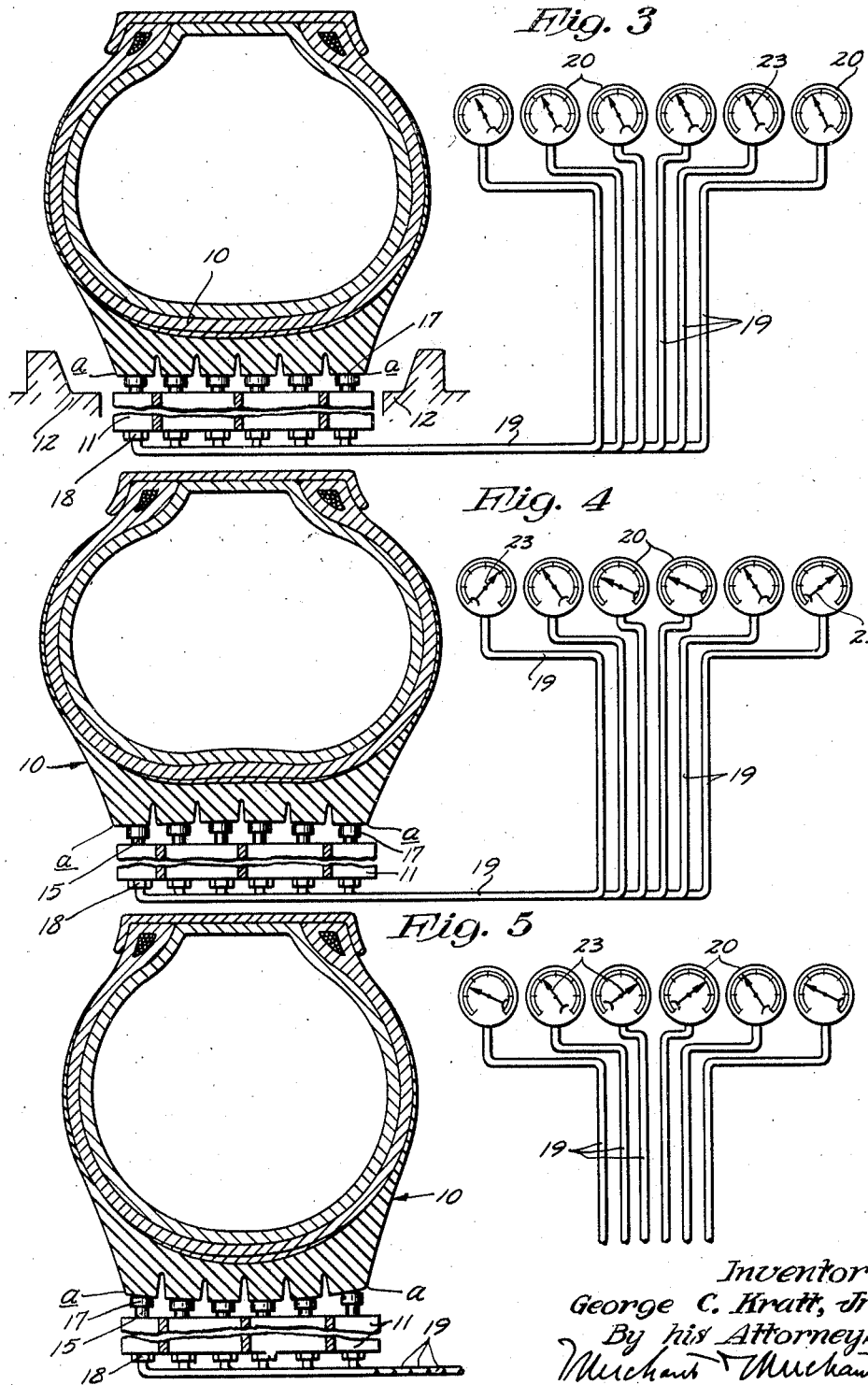

March 9, 1943.  G. C. KRATT, JR  2,313,156
METHOD OF INFLATING PNEUMATIC TIRES TO PROPER
INTERNAL AIR PRESSURE UNDER LOAD
Filed Feb. 12, 1941  3 Sheets-Sheet 3
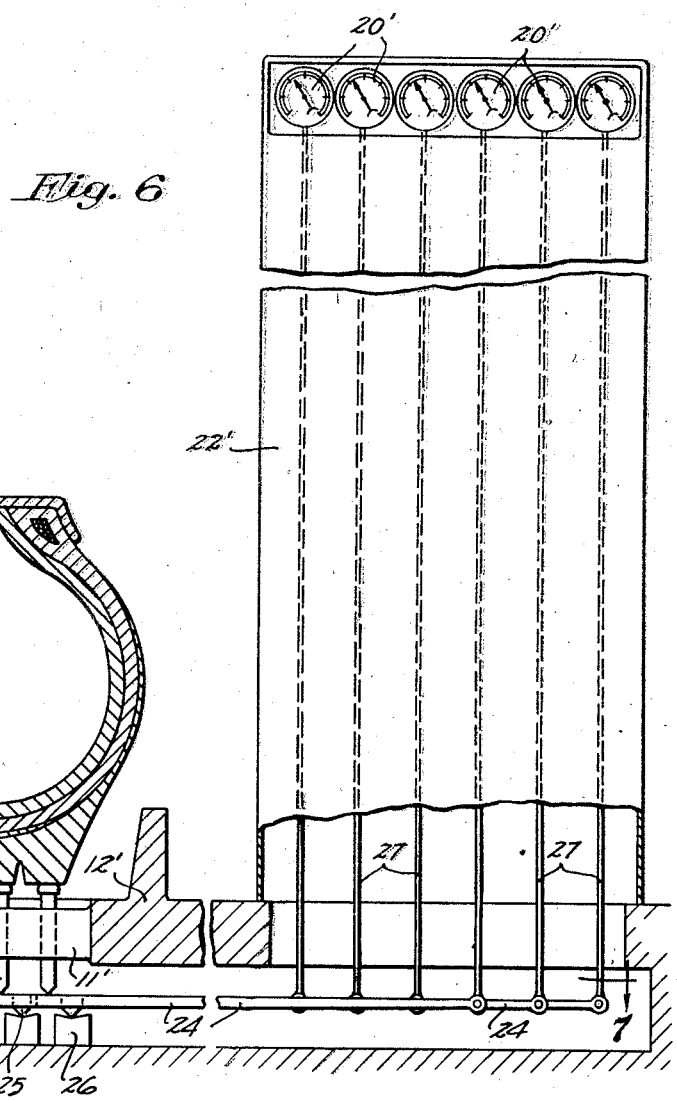
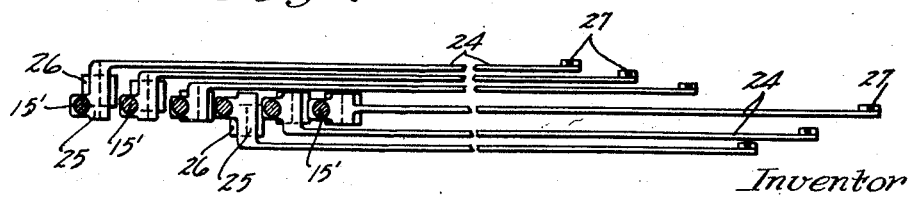
Inventor
George C. Kratt, Jr.
By his Attorneys Patented Mar. 9, 1943

2,313,156

UNITED STATES PATENT OFFICE 2,313,156

METHOD OF INFLATING PNEUMATIC TIRES TO PROPER INTERNAL AIR PRESSURE UNDER LOAD

George C. Kratt, Jr., Nisswa, Minn.

Application February 12, 1941, Serial No. 378,546

2 Claims. (Cl. 73—51)

My present invention is directed to an improved method of inflating pneumatic tires to proper internal air pressure when subject to a definite load.

The road-engaging crown surface of a tire is transversely arcuate when inflated and unrestrained against outward expansion. Under load, however, the road-engaging crown surface flattens out and under pressures for certain loads, there will be uneven pressures at transverse points on such flattened road-engaging surface which does not give the best road-engaging contact nor the best wearing surface in the tire. According to my theory and experience, the proper and most efficient pressure in a pneumatic tire for a given load is arrived at when the entire transverse surface of the crown surface is in inflated engagement with the road when the pressure exerted by the tire on the road is the same throughout the transverse width of the road-engaging crown of the tire.

If the tire is over-inflated, the load will be unevenly distributed across the road-engaging crown surface and will be greatest at the transverse center, the transverse edge portions of the crown either bearing only very lightly on the road or possibly being raised off of the road.

On the other hand, if the tire is under-inflated with respect to the load it is carrying, the marginal edge portions of the road-engaging crown radially over the thick shoulders of the tread will bear most heavily on the road and the transverse central portion of the tread will tend to bulge or "belly-up" and engage the road very lightly. Such a condition provides poor performance of the vehicle and tends to pound the stiff thick shoulders loose from the carcass, and to causing uneven and severe flexing of the tire carcass.

The testing apparatus by which my method may be carried out includes a multiplicity of independent pressure-indicating devices with depressible plungers or actuating elements of the several indicators spaced transversely of a tire runway, and hence, transversely of the road-engaging crown surface of the tire, the pressures of which are to be indicated at the several points transversely of the tire. The dials or pressure indicators proper are preferably assembled at one side of the runway where they can be seen and compared.

It may be here stated that when the air pressure in the tire has reached a certain point, the several indicator dials will indicate the same or substantially the same pressures, but this is a matter that will be more fully explained after first having described a preferred embodiment of the invention illustrated in the accompanying drawings wherein like characters indicate like parts throughout the several views.

Referring to the drawings:

Figs. 3, 4 and 5 are transverse sections, some parts being shown diagrammatically, illustrating different conditions of the indicator devices under different tire pressures;

Fig. 6 is a view partly in transverse vertical section and partly in elevation illustrating one apparatus that may be employed in carrying out my invention; and Fig. 7 is a horizontal section taken on the line 7—7 of Fig. 6.

Figure 1:
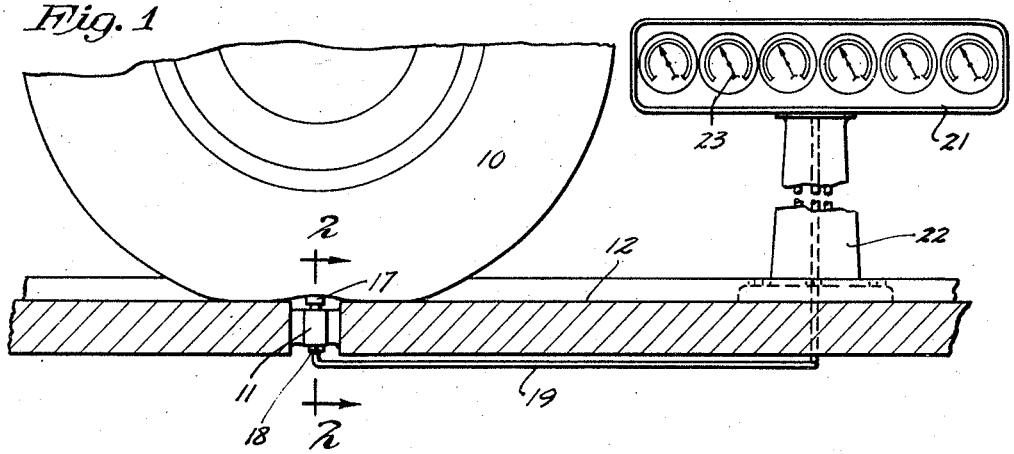
Fig. 1 is a side elevation, with some parts broken away, showing the tire runway with the tire indicating apparatus applied with its depressible indicator actuating elements transversely thereof and with a tire resting on the said actuator elements.
Figure 2:
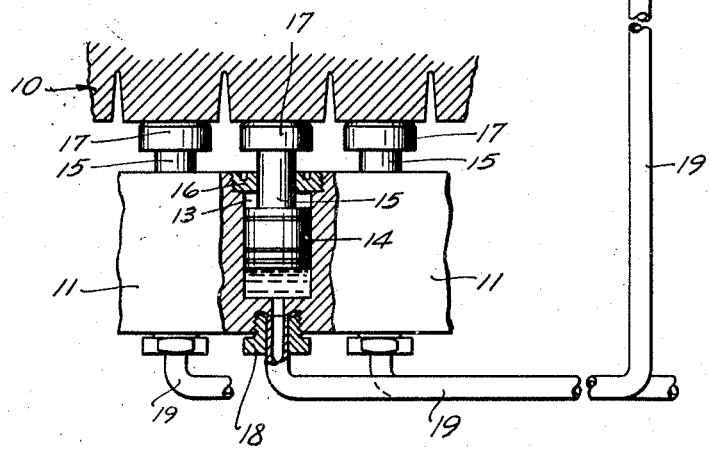
Fig. 2 is an enlarged transverse section taken on the line 2—2 of Fig. 1, with some parts in full and with one of the indicator dials turned 90° from the position shown in Fig. 1.

The numeral 10 indicates a pneumatic tire, the road-engaging crown surface of which is between the shoulders marked a—a. A cylinder block 11 is rigidly set within and extended transversely of a tire runway 12. This cylinder block 11 is formed with cylinders 13 that are spaced transversely of the runway, and hence, transversely of the road-engaging crown surface of a tire driven in the runway above the cylinder block.

Working in the cylinders 13 are pistons 14, the stems 15 of which, as shown, work through annular cylinder heads 16 and preferably terminate in enlargements or heads 17. The lower ends of the cylinders, by suitable means such as threaded clamping sleeves 18, are independently connected to tubes 19 that lead to pressure indicators proper, which latter are preferably of the dial and pointer type. The dial-equipped casings 20 of these indicators are preferably assembled on a main casing 21 supported from a pedestal 22 or the like at one side of the runway. The pointers 23 of these pressure indicators will be actuated preferably by fluid contained in the lower ends of the cylinders 13 and in the individual tubes 19.

A pneumatic tire under load and under certain high internal air pressure will have greater load pressure on the transversely central portion of the tire than at points transversely outward of the central or medial plane of the tire. However, there will be some certain air pressure for a tire under determined load where the road pressure of the tire will be the same or substantially the same at transversely different road-engaging points; and that will be the proper or most efficient pressure for that particular tire and load. If the pressure on all of the plungers is the same, the indicator pointers will all stand as shown in Fig. 3 indicating like pressures; and that will indicate the proper or most efficient running pressure for the tire for some certain given load. When the tire pressures for several loads, greater or less, are such that the loads carried at a plurality of spaced points transverse of the road engaging crown are equal, the indicator pointers will indicate the same pressures but greater or less than the pressures indicated in Fig. 3; but for all the different loads assumed and for which the tires are being tested, the several indicators will give the same pressure indications.

If the pressures for a given load carried by the tire being tested is too low or too great for the given load, the several pressure indicators will indicate different pressures. If the pressure for the load is too low for the load, the road-engaging face of the tire will be upwardly bulged, as shown in Fig. 4, and the pointers of the several pressure indicators will vary, the one from the other, substantially as indicated in Fig. 4. If, however, the tire pressure for the load carried by the tire being tested is too high, the road-engaging crown of the tire will be bulged transversely downward and the pointers of the several indicators will vary substantially as shown in Fig. 5.

The term "tire or wheel runway" is used in a broad sense to include anything that will direct or cause movement of the wheel and tire transversely across the laterally spaced plungers or indicator actuators.

As a further illustration of the invention, the structure of Figs. 6 and 7 is shown. In this modified structure the pneumatic tire is indicated by the character 10' and the runway is indicated by the character 12'. The depressible elements are in the nature of plungers 15' mounted in a block 11' rigidly set into an opening in the runway. The structure illustrated in these views 6 and 7 is entirely mechanical, that is, it does not employ fluid to transmit the tire pressure to the indicators. The indicators 20' are shown as mounted on an upright casing or standard 22' affixed at one side of the runway. The lower ends of the depressible plungers 15' operate on the short ends of cooperating levers 24 and have fulcrum points 25 resting upon fixed fulcrum blocks 26. At the free ends the levers 24 are connected to the lower ends of rods 27, the upper ends of which are connected to the cooperating indicators 20'. These indicators are of a well known type, the pointers of which normally stand at zero. By reference particularly to Fig. 7 it will be noted that the levers 24 vary somewhat in length and measured from their fulcrums the short ends are proportioned to the length ends so that they will have like actions on the various indicators. Also it should be understood that indicators of any desirable character may be employed to actually register the pressures.

From the foregoing it will be understood that this tire tester will very accurately and quickly indicate when the tire has been charged with a pressure which, for the load it is carrying while being tested, is correct or best for carrying the particular load on that particular tire. It is thought that the principles involved both in the apparatus and in the process in this invention have been clearly outlined, but it will be understood that various alterations may be made within the scope of the invention disclosed and herein broadly claimed.

What I claim is:

1. The method of inflating pneumatic tires to proper internal air pressure under definite road-engaging load pressure, which consists in subjecting the tire to such definite load and determining the road-engaging pressures at different points transversely of the tire, and in varying the air pressure in the tire until the indicated load pressures at the several transverse points are substantially the same, at which time the proper internal air pressure of the tire for the predetermined load will be indicated.

2. The method of inflating pneumatic tires to proper internal air pressure under definite road-engaging load pressure, which consists in supporting the thus loaded tire on a plurality of pressure indicators spaced transversely of the tire, and in varying the air pressure in the tire until the several indicators indicate substantially the same pressures, at which time the proper internal air pressure of the tire for the predetermined load will be indicated.

GEORGE C. KRATT, Jr.